July 18, 1961 M. FISCHMAN 2,993,173

BLOCKING OSCILLATOR FREQUENCY DIVIDER USING REFLECTIVE DELAY LINES

Filed Sept. 2, 1958

INVENTOR
MARTIN FISCHMAN
BY [signature]
ATTORNEY

United States Patent Office 2,993,173

Patented July 18, 1961

2,993,173

BLOCKING OSCILLATOR FREQUENCY DIVIDER USING REFLECTIVE DELAY LINES

Martin Fischman, Wantagh, N.Y., assignor, by mesne assignments, to Sylvania Electric Products Inc., Wilmington, Del., a corporation of Delaware Filed Sept. 2, 1958, Ser. No. 758,313

4 Claims. (Cl. 328—40)

Figure 1:
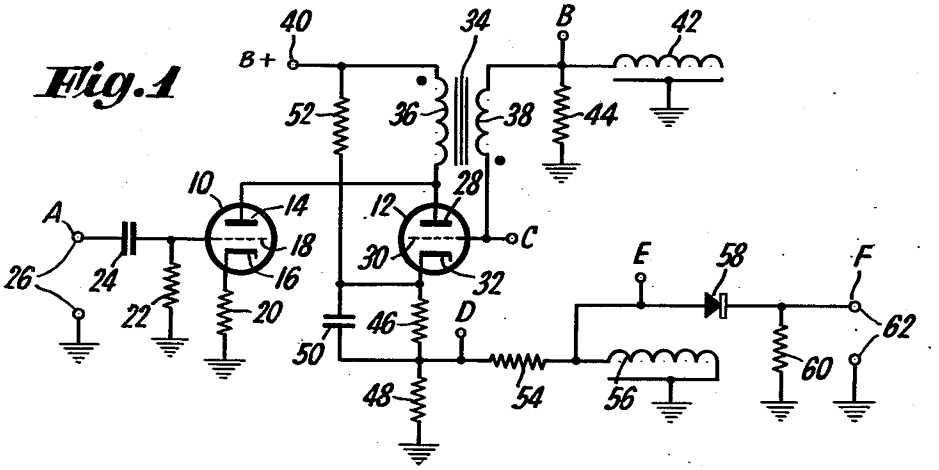

My invention relates to pulse generators.

There are various applications where it is desired to derive from an input signal comprising a series of pulses, an output signal wherein the number of pulses per unit time bears an integral submultiple relationship to the number of input pulses per unit time. Such a device is known as a frequency divider. Conventional frequency divider circuits typically comprise a blocking oscillator in conjunction with a highly regenerative circuit and a resistance-capacitor timing circuit.

However, these circuits are subject to certain very undesirable inherent limitations. For example, the operation of such circuits is characterized by instability and jitter with normal changes in the blocking oscillator characteristics. As a result, there is an instability in the dividing ratio, i.e., there is an unwanted variation in the number of output pulses for a given number of input pulses. Another undesirable consequence of this instability exhibits itself as an uncontrolled sporadic type of runaway operation; in this condition output pulses are produced even when no input pulses are being presented to the divider circuit.

Accordingly, it is an object of this invention to provide a circuit of the type described which is not subject to instability due to normal changes in the oscillator characteristics.

Another object is to produce an improved frequency divider type circuit wherein the accuracy of the dividing ratio is unaffected by normal variations in the blocking oscillator characteristics.

Still another object is to effect a reduction in the cost of certain relatively expensive components, such as delay lines, which are normally employed in the general type of circuit herein referred to.

In accordance with the principles of my invention, I provide a circuit responsive to a first pulse train of given recurrence frequency and including means to derive from the first train a second pulse train of like recurrence frequency. The second train is composed of odd and even pulse groups, each containing the same number of pulses, each pulse in the even numbered groups being a time delayed representation of the corresponding pulse in the immediately preceding odd numbered group.

Further means are provided for summing together the pulses of the first train and the time delayed representation pulses of the second train to produce control pulses at intervals when only pulses in the odd numbered groups are present.

Means responsive to the control pulses, such as, for example, an electron discharge device, are also provided for developing a first output pulse train in an output circuit thereof during intervals when the control pulses occur. As a result, a first output pulse train is produced wherein there are fewer output pulses per unit time than there are incoming pulses per unit time.

Means are further provided in said output circuit and responsive to said first output train for suppressing a predetermined number of pulses in said first output train to thereby produce a second output train having therein a fewer number of pulses than said first output train. The second output train contains pulses of both positive and negative polarities; means are therefore provided for eliminating pulses of one polarity to produce a third output pulse train wherein all the pulses are of the same polarity. A frequency divider is thus produced wherein the number of output pulses per unit time bears an integral submultiple relationship to the number of pulses per unit time in the input pulse train.

Figure 2:
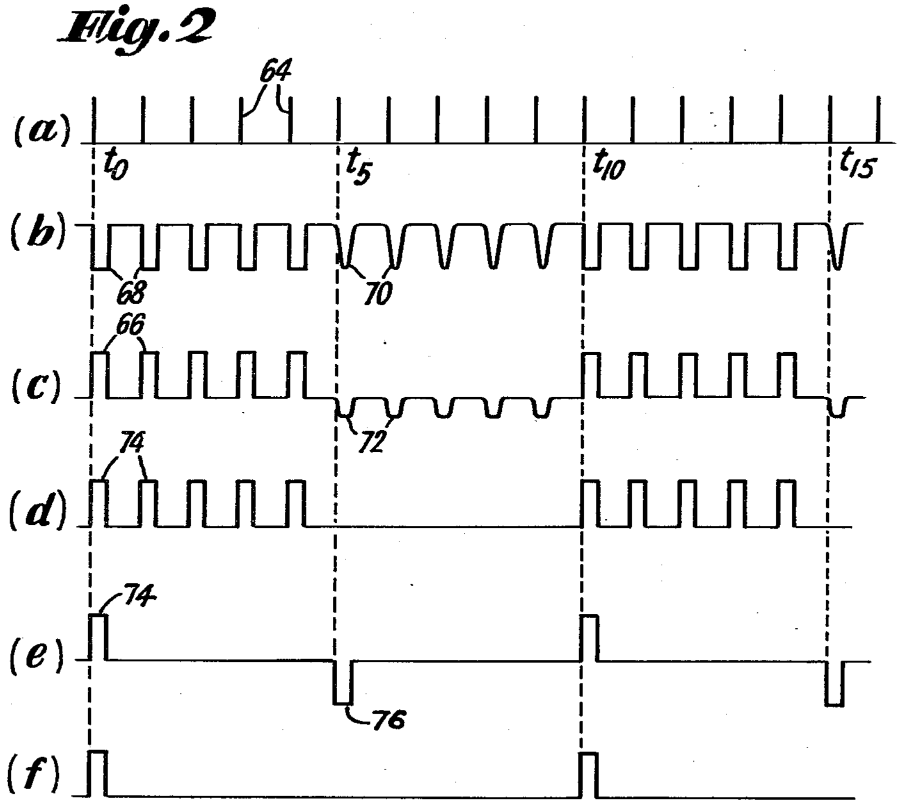

My invention will now be described in detail with reference to the accompanying drawings wherein:

FIG. 1 is a schematic circuit diagram of an illustrative embodiment of the invention; and FIG. 2 depicts signal waveforms at selected points of the circuit.

Referring now to FIG. 1, there is provided a frequency divider circuit including a pulse amplifier comprising a tube 10 and its associated components which is coupled to a blocking oscillator comprising a tube 12 and its associated components. An input pulse train is supplied to the pulse amplifier and output pulses are produced in a circuit connected to the cathode of the blocking oscillator.

The pulse amplifier tube 10 is provided with an anode 14, cathode 16 and control grid 18. The amplifier circuit includes a cathode resistor 20, grid resistor 22 and grid blocking condenser 24, the latter being connected between the control grid 18 and one of the input terminals 26. The output of the pulse amplifier tube is connected to the anode circuit of the blocking oscillator.

The blocking oscillator tube 12 is provided with an input electrode or anode 28, a control electrode or grid 30 and an output electrode or cathode 32. An oscillation feedback loop comprising a transformer 34 having a primary 36 and a secondary 38 is connected between the anode 28 and grid 30. The primary and secondary are connected in the circuit in positive feedback manner so that the tube 12 functions as an oscillator when a pulse is supplied to the primary. The primary is connected between a point of positive potential 40 and the anodes 14 and 28 of the tubes 10 and 12 respectively, which are connected together. One end of the secondary 38 is connected to the control grid 30 and the other end is connected to an open circuited delay line 42 and to a resistor 44, the resistor being connected to ground (negative potential) at its other end.

The output circuit, which is connected to the cathode 32 of the blocking oscillator, will now be described. The cathode is connected to ground through two resistors 46 and 48 which are series connected. The primary function of the resistor 46 is to develop a grid bias and is therefore bridged by a bypass capacitor 50 in conventional fashion. The resistor 48 functions primarily as a potential developing resistor across which pulses are produced when the tube 12 is rendered conductive.

The resistors 46 and 48 also provide, in conjunction with a resistor 52, a voltage divider circuit between the point of positive potential and the point of negative potential or ground. The purpose of this divider is to provide a sufficient negative potential between the cathode 32 and grid 30 to maintain the tube 12 in a non-conductive state in the absence of current flow therein.

The pulse developing resistor 48 is bridged by a series circuit comprising a resistor 54 and a shorted delay line 56. The shorted delay line 56 is bridged by a series circuit comprising a diode 58, and a resistor 60. Output terminals 62 are provided for utilizing output potential pulses developed across the resistor 60.

The operation of the circuit will now be explained with particular reference to the waveforms shown in FIG. 2, wherein the six pulse trains at *a, b, c, d, e* and *f* in FIG. 2 represent the potentials existing with respect to time at the points A, B, C, D, E and F respectively in FIG. 1.

An incoming or first pulse train of given recurrence frequency, FIG. 2*a*, having pulses 64, is applied to the input terminals 26 of the pulse amplifier where it is amplified and reversed in polarity and then applied to the primary 36 of the transformer 34. By transformer action the pulses of the first train are then induced in the secondary 38 and appear as positive control pulses 66 on the grid 30 of the normally non-conductive oscillator tube 12, point C, FIG. 1. These pulses are sufficiently positive to fire the oscillator, thus rendering the tube 12 conductive for short intervals. Since the grid is driven positive, grid current flows through the resistor 44, producing negative pulses 68 at the end of the delay line 42 indicated by point B. These negative pulses 68 travel down the delay line and are reflected back to the sending end of the line after a time $2t_a$, where $t_a$ is the time delay of the delay line 42. The reflected or returning pulses 70 have a polarity the same as the impressed pulses, since the delay line is an open-circuited one. The returning pulses 70 are therefore also negative and appear at the point B as do the pulses 68, see FIG. 2*b*. Thus, a second pulse train of like recurrence frequency as that of the first pulse train is produced at point B comprising odd and even numbered pulse groups, the odd pulse groups being made up of pulses 68 from time $t_0$ to $t_5$, $t_{10}$ to $t_{15}$, etc. and the even pulse groups being made up of pulses 70 from time $t_5$ to $t_{10}$, $t_{15}$ to $t_{20}$, etc. The number of pulses in the even groups of pulses is the same as the number of pulses in the odd groups. Further, each of the pulses 70 in the even groups is a time delayed representation of the corresponding pulses 68 in the immediately preceding odd numbered group.

The reflected pulses 70 produced by the delay line 42 have a polarity opposite that of the incoming pulses of the first train produced across the transformer secondary 38. The combination of these two series of pulses has a cancellation or summation effect. However, since the amplitudes of pulses 70 are longer than the amplitudes of the pulses in the first train negative pulses 72 are produced from itme $t_5$ to $t_{10}$, $t_{15}$ to $t_{20}$, etc. in a control pulse train, FIG. 2*c*, comprising the groups of pulses 72 and the groups of control pulses 66, the latter occurring only in the absence of the time delayed representation pulses 70. This control train appears at the grid 30 of the blocking oscillator, point C. The polarity of the pulses 72 is negative nad therefore the normally non-conductive oscillator is not triggered from time $t_5$ to $t_{10}$, $t_{15}$ to $t_{20}$, etc. However, the positive pulses 66 do trigger the oscillator, producing at times $t_0$ to $t_5$, $t_{10}$ to $t_{15}$, etc. a first output train of pulses 74, FIG. 2*d*, across the cathode resistor 48, and at point D, FIG. 1. The number of pulses in this train is half the number of pulses in the incoming pulses train, FIG. 2*a*.

A further reduction in the number of pulses is achieved by means of the delay line 56 which produces a second output pulse train, comprising pulses 74 and 76, FIG. 2*e*. This is achieved by employing a delay line which is shorted, since a shorted delay line reflects pulses of opposite polarity to those impressed on the line, and by choosing the time delay $t_b$ of the line to be equal to one-half the period of the impressed pulses. Therefore, when each pulse 74 is impressed on the sending end (point E, FIG. 1) of the delay line 56, a negative pulse is reflected back and appears at point E at a time equal to $2t_b$, the period of recurrence of the pulses 74. The negative reflected pulses therefore arrive at point E at exactly the same time as a pulse 74, thus suppressing or cancelling all the pulses from $t_1$ to $t_5$. The first pulse from time $t_0$ to $t_1$ is not cancelled because no reflected pulse is present at point E until time $t_1$.

At time $t_5$ the negative pulse 76 appears at point E as a result of the pulse sent down the delay line 56 at time $t_4$. This negative pulse is removed by the diode 58, thus producing a third output pulse train at the terminals 62, FIG. 2*f*, wherein all the pulses are of one polarity. If desired, the pulse 76 could be reversed in polarity, rather than eliminated.

Although my invention has been described with the aid of a particular circuit, it is clear that various well known circuit modifications can be employed to carry out the purposes of my invention. For example, the oscillation feedback loop transformer 34 could be coupled between the cathode and control grid of the oscillator tube 12, instead of between the anode and control grid as has been described. In such case the incoming pulse train would still of course be coupled to the feedback loop; however, the output circuit comprising the delay line 56, diode 58 and resistors 54 and 60 would then be coupled, unaltered, to the anode instead of to the cathode.

What is claimed is:

1. A frequency divider comprising a transformer having primary and secondary windings; a blocking oscillator provided with an electron discharge tube having a cathode, an anode and a control grid, a first circuit interconnecting said anode and cathode and including said primary winding, and a second circuit interconnecting said cathode and grid and including said secondary winding, said oscillator being triggered to produce an output pulse of predetermined duration each time a positive pulse of predetermined amplitude is produced in said second circuit; means to apply a first negative pulse train of fixed recurrence frequency and period across said primary winding to thereby produce a second positive pulse train of said frequency across siad secondary winding; time delay means coupled to said secondary winding to derive from said second train a third negative pulse train of said frequency, said third pulse train being returned with time delay to said secondary winding and summed thereat with said second train to produce a fourth pulse train, the delay period of said delay means being an even integral multiple of the period of said first train and thus having a value at which said fourth train contains alternating odd and even numbered pulse groups of like duration, the odd groups containing only second train pulses, the even groups containing summation pulses, said oscillator being triggered only by pulses in said odd groups whereby frequency division is obtained.

2. A frequency divider as set forth in claim 1 wherein said delay means is an open circuited delay line.

3. A frequency divider comprising a transformer having primary and secondary windings; a blocking oscillator provided with an electron discharge tube having a cathode, an anode and a control grid, a first circuit interconnecting said anode and cathode and including said primary winding, and a second circuit interconnecting said cathode and grid and including said secondary winding, said oscillator being triggered to produce an output pulse of predetermined duration each time a positive pulse of predetermined amplitude is produced in said second circuit; first means to apply a first negative pulse train of fixed recurrence frequency and period across said primary winding to thereby produce a second positive pulse train of said frequency across said secondary winding; an open circuited delay line coupled to said secondary winding to derive from said second train a third negative pulse train of said frequency, said third pulse train being returned with time delay to said secondary winding and summed thereat with said second train to produce a fourth pulse train, the delay period of said line being an even integral multiple of the period of said first train and thus having a value at which said fourth train contains alternating odd and even numbered pulse groups of like duration, the odd groups containing only second train pulses, the even groups containing summation pulses, said oscillator being triggered only by pulses in said odd groups whereby frequency division is obtained; and a short circuited delay line coupled to said first circuit and responsive to said output pulses to cancel by reflection and summation certain of said output pulses and thereby obtain additional frequency division, the delay time of said shorted line being equal to the period of said first pulse train.

4. A frequency divider as set forth in claim 3 further including a rectifier shunting said short circuited line.

References Cited in the file of this patent

UNITED STATES PATENTS

| | | |
|---|---|---|
| 2,461,110 | Fischman | Feb. 8, 1949 |
| 2,631,232 | Baracket | Mar. 10, 1953 |